US007530650B2

(12) United States Patent
Hannan et al.

(10) Patent No.: US 7,530,650 B2
(45) Date of Patent: May 12, 2009

(54) CRAWLER TRACK SHOE WITH MULTIPLE ROLLER PATHS AND MULTIPLE DRIVE LUGS

(76) Inventors: Keith Hannan, 61 Park Street, Charlestown, New South Wales (AU); Philip Worrall, 33 Lobelia Avenue, Daisy Hill, Queensland (AU)

( * ) Notice: Subject to any disclaimer, the term of this patent is extended or adjusted under 35 U.S.C. 154(b) by 318 days.

(21) Appl. No.: 10/482,685

(22) PCT Filed: Jul. 5, 2002

(86) PCT No.: PCT/AU02/00901

§ 371 (c)(1),
(2), (4) Date: Jan. 2, 2004

(87) PCT Pub. No.: WO03/004336

PCT Pub. Date: Jan. 16, 2003

(65) Prior Publication Data

US 2004/0178676 A1  Sep. 16, 2004

(30) Foreign Application Priority Data

Jul. 6, 2001  (AU) .................................... PR6164

(51) Int. Cl.
*B21L 3/00* (2006.01)
*F16H 7/06* (2006.01)

(52) U.S. Cl. ...................... 305/201; 305/196

(58) Field of Classification Search ................. 305/201, 305/111, 113, 185–186, 196, 198, 200, 187, 305/46, 195, 202, 57; D15/28, 10, 22
See application file for complete search history.

(56) References Cited

U.S. PATENT DOCUMENTS

| 1,474,967 | A | * | 11/1923 | Heine | .......................... 305/111 |
| 1,973,214 | A | | 9/1934 | Lamb | |
| 2,167,039 | A | | 7/1939 | Ekbom | |
| 2,392,383 | A | | 1/1946 | Hollenkamp | |

(Continued)

FOREIGN PATENT DOCUMENTS

AU    2002300476 A1    6/2003

(Continued)

OTHER PUBLICATIONS

European Search Report for Application No. EP 02 74 2534 mailed Mar. 23, 2006.

*Primary Examiner*—Jason R Bellinger
(74) *Attorney, Agent, or Firm*—Cantor Colburn LLP

(57) ABSTRACT

A shoe (10) for a crawler track has two roller paths (16, 17) thereon, upon which a dual rim roller travels in use. The roller paths (16, 17) are aligned with leading and trailing lugs (11, 12) respectively, of the shoe 10. Drive lugs (18, 19) are provided on the outside of the roller paths (16, 17). In use, the drive lugs (18, 19) are engaged by sprocket teeth to drive the crawler track. The drive lugs (18, 19) stand proud of the roller paths (16, 17), but may also be recessed below the roller paths.

6 Claims, 2 Drawing Sheets

U.S. PATENT DOCUMENTS

| | | | |
|---|---|---|---|
| 2,452,921 A | * 11/1948 | Gillespie | 305/53 |
| 3,128,130 A | * 4/1964 | Harris | 305/53 |
| 3,477,769 A | * 11/1969 | Thompson | 305/201 |
| 3,721,476 A | 3/1973 | Andersson | |
| 4,175,797 A | 11/1979 | Krekeler | |
| 4,455,053 A | * 6/1984 | Rasmussen | 305/53 |
| 5,409,306 A | 4/1995 | Bentz | |
| 6,543,863 B1 | 4/2003 | Hannan et al. | |
| D484,149 S | * 12/2003 | Hannan et al. | D15/28 |
| 6,659,573 B1 | * 12/2003 | Knecht et al. | 305/195 |

FOREIGN PATENT DOCUMENTS

| | | | |
|---|---|---|---|
| DE | 2721018 | 11/1978 | |
| EP | 0 521 734 A1 | 1/1993 | |
| FR | 737682 A | * 12/1932 | 305/200 |
| JP | 406144308 A | * 5/1994 | 305/200 |
| WO | WO 99/46158 | 9/1999 | |

* cited by examiner

CRAWLER TRACK SHOE WITH MULTIPLE ROLLER PATHS AND MULTIPLE DRIVE LUGS

This invention relates to an improved shoe for a crawler track. In particular, the invention is directed to a crawler track shoe having dual roller paths and dual drive lugs.

BACKGROUND ART

Some items of large mining machinery, such as mining shovels and electric or hydraulic excavators, are fitted with crawler tracks for locomotion. The individual links in the crawler tracks are known as "shoes". These track shoes, also known as "crawler shoes", are linked together by pivot pins to form an endless articulated track, each track being mounted on a row of support rollers. Drive sprockets at either end of the row of support rollers engage lugs on the crawler shoes to drive the track. The rollers roll upon the ground-engaging track shoes of the track as the track is driven by the sprockets. Each roller may be provided with dual rims.

The weight of the machinery is borne by the particular track shoe(s) upon which the rollers bear. As the rollers move from one track shoe to another, the weight of the machinery is transferred between shoes. In view of the large weight being carried, any point loads or concentrated loads must be avoided, as such loads may crack or distort a track shoe, or otherwise cause excessive wear.

There are various known crawler shoe designs. FIG. 1 illustrates crawler shoes of a first known type. As can be seen in that drawing, each shoe has a pair of roller paths "A" (shown cross-hatched) along which dual rollers travel, and a single drive lug "B" which is engaged by a sprocket in use. One disadvantage of dual roller path/single drive lug shoes is that the drive lug often wears out before the roller paths.

The known track shoes shown in FIG. 1 have a longitudinal split "C" in each roller path. The aim of the longitudinal split is to transfer approximately half of the load from one shoe to the next. In theory, the load is split evenly between two shoes on either side of the longitudinal split. As the roller moves from one shoe to the next, half the load is initially transferred across the longitudinal split to the next roller, followed shortly thereafter by the other half of the load. The load transfers in the two roller paths occur simultaneously.

However, it has been found in practice that the longitudinal split in each roller path causes accelerated wear and metal flow in the crawler shoes. As the machinery may be operating on sloping or undulating ground, or over rocks, and since the wear characteristics of adjacent crawler shoes are not identical, the high contact pressure applied by a roller on a roller path is not distributed evenly across the longitudinal split. The effect of concentrating the weight on a shoe on one side only of the longitudinal split, and particularly on the edge portion of the shoe near the longitudinal split, is to cause premature metal flow or "toe nailing" of the track shoes along the roller path. This in turn causes the track shoes to bind with mating shoes, which can result in cracking and failure of the track shoe.

Another type of crawler shoe design can be found in international patent application no. PCT/AU99/00156. The track shoe illustrated in that patent application has a single roller path and dual drive lugs located on opposite sides of the roller path. A disadvantage of dual drive lug/single roller path designs is that the roller path often wears out before the drive lugs. Further, the maximum propel speed of the machine is limited due to the rough transition of load rollers between shoes.

It is an object of this invention to provide an improved crawler shoe which overcomes or ameliorates the above described disadvantages, or which at least provides the consumer with a useful choice.

SUMMARY OF THE INVENTION

In one broad form, the invention provides a shoe for a crawler track, the shoe having multiple roller paths thereon and multiple drive lugs.

Preferably, the shoe has two or dual roller paths, and two or dual drive lugs, the drive lugs being located on the outside of the respective roller paths.

Each roller path is suitably defined by a flat or curved surface on the shoe. The drive lugs may have a recessed contact portion, allowing the drive sprocket teeth to contact above and below the roller path. Alternatively, the drive lugs may protrude allowing the drive sprocket teeth to contact above the roller path only.

Additionally, the drive lugs may be replaceable, as described in our co-pending Australian patent application no. PR6878.

The combination of the dual roller paths and the dual drive lugs enables the shoe life to be increased, i.e. by reducing wear on the drive lugs and roller path, and the drive sprocket teeth.

In the preferred embodiment, the crawler shoe has a leading lug portion, and a trailing lug portion laterally offset from the leading lug portion such that when two like shoes are linked in a track, the leading lug of one is laterally aligned with the trailing lug of the other. There are two roller path surfaces on the crawler shoe aligned longitudinally with the leading and trailing lug, respectively, such that when like shoes are linked together in a track, the transitions between adjacent crawler shoes in one roller path are longitudinally offset from transitions between the same adjacent crawler shoes in the other roller path. In this manner, the roller is continuously supported across a complete roller path on at least one crawler shoe.

That is, at any particular time, the roller will be supported across the full width of a roller path on a crawler shoe (although the particular track shoe will change as the roller moves along the track).

In use, a dual rim roller travels upon and along the two roller paths on each crawler shoe. As the transitions between shoes in the two paths are staggered or spaced in the direction of travel, when one rim of the dual roller is making the transition from one crawler shoe to the next, the other rim of the dual roller will be fully supported on its roller path.

The "continuous" roller path crawler shoe of this invention enables smoother roller transition from one shoe to the next. The smoother roller transition under load from one crawler shoe to the next reduces wear and metal flow commonly associated with known track shoe designs.

The offset transitions also allow smoother and faster propelling of the machine over ground.

In another form, the invention provides an articulated crawler track having a plurality of shoes as described above, linked together to form an endless track.

In order that the invention may be more fully understood and put into practice, a preferred embodiment thereof will now be described by way of example, with reference to the accompanying drawings

DESCRIPTION OF PREFERRED EMBODIMENT

Figure 2:
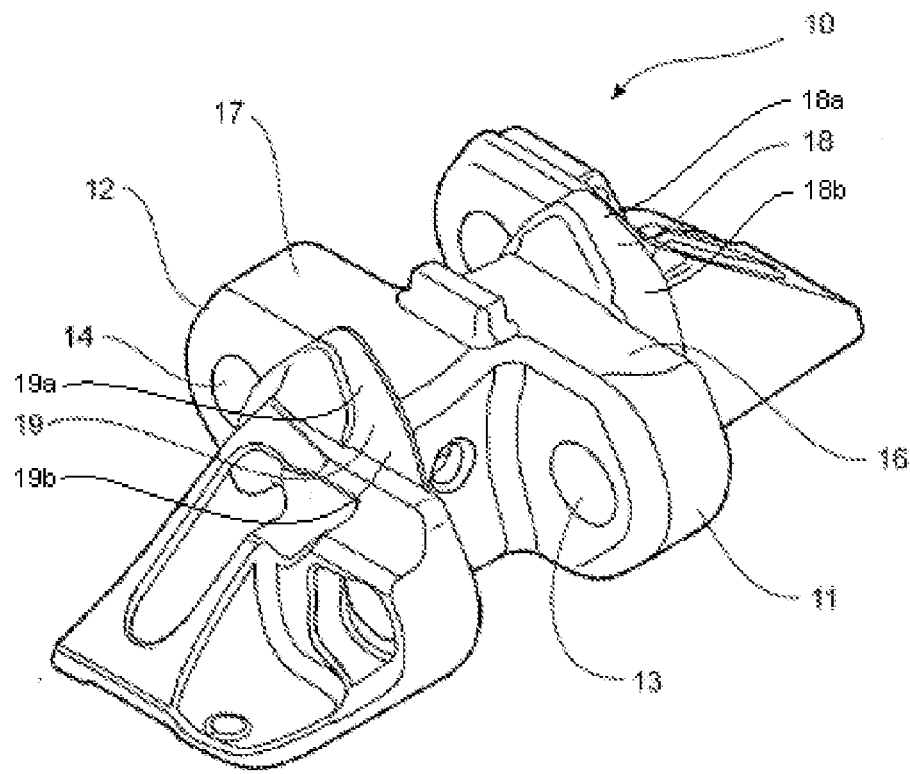
FIG. 2 is a perspective view from above of a track shoe according to one embodiment of the invention.
Figure 3:
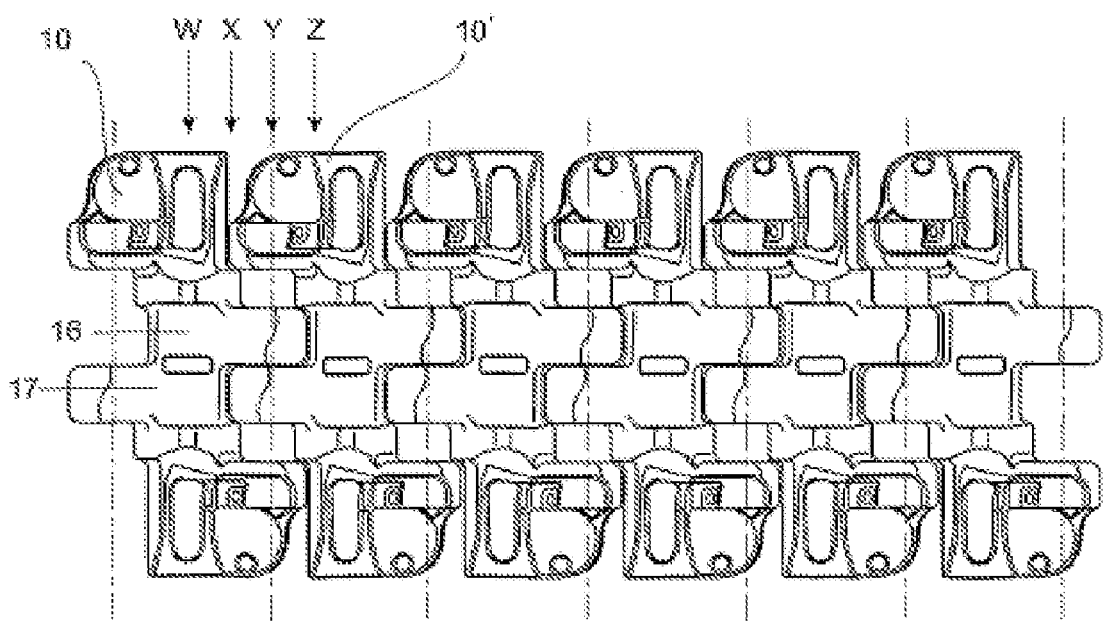
FIG. 3 is a plan view of a linked series of track shoes of the type shown in FIG. 2, forming part of a crawler track.

As shown in FIG. 2, a crawler shoe 10 comprises a body having a leading lug 11 as well as a trailing lug 12. The lugs 11,12 are provided for connection to adjacent shoes in a track. The trailing lug 12 is spaced laterally (i.e. transverse to the direction of travel) from the leading lug 11 such that when like shoes 10 are arranged in a track as shown in FIG. 3, a pinhole 13 in the leading lug 11 of one shoe aligns laterally with a pin hole 14 in the trailing lug 12 of an adjacent shoe. Pivot pins (not shown) are inserted in the aligned holes to link the shoes and thereby form an endless crawler track.

The bottom of each track shoe 10 may suitably be provided with cleats (not shown) for increased traction.

The illustrated crawler shoe is designed for use with a dual rim or dual track roller (not shown), and is provided with a pair of roller path surfaces 16, 17 on the upper side thereof, each aligned with a respective leading/trailing lug 11, 12. The roller paths 16, 17 are formed by flat or slightly curved surfaces on the shoe, of approximately the same width as the respective leading or trailing connection lugs with which they are aligned.

As can be better appreciated by reference to FIG. 3, when a dual rim roller is situated approximately half way along a shoe 10 (position W), the weight of the roller will be borne on both roller paths 16, 17 of shoe 10. When the roller is making a transition along one roller path 17 from shoe 10 to its adjacent shoe 10' (position X), the bulk of the weight will now be supported on the other roller path 16 of shoe 10.

After the transition has been made in roller path 17, the weight will again be borne on both roller paths, but on different track shoes 10, 10' (position Y).

The next transition will occur on roller path 16 (position Z), during which the bulk of the weight will be borne by the full roller path 17 on track shoe 10'.

At any particular time therefore, the bulk of the weight of the machinery will be borne on at least one full roller path. This minimises wear of the crawler shoes and provides for a smoother transition of the dual rim rollers from one crawler shoe to the next.

Figure 1:
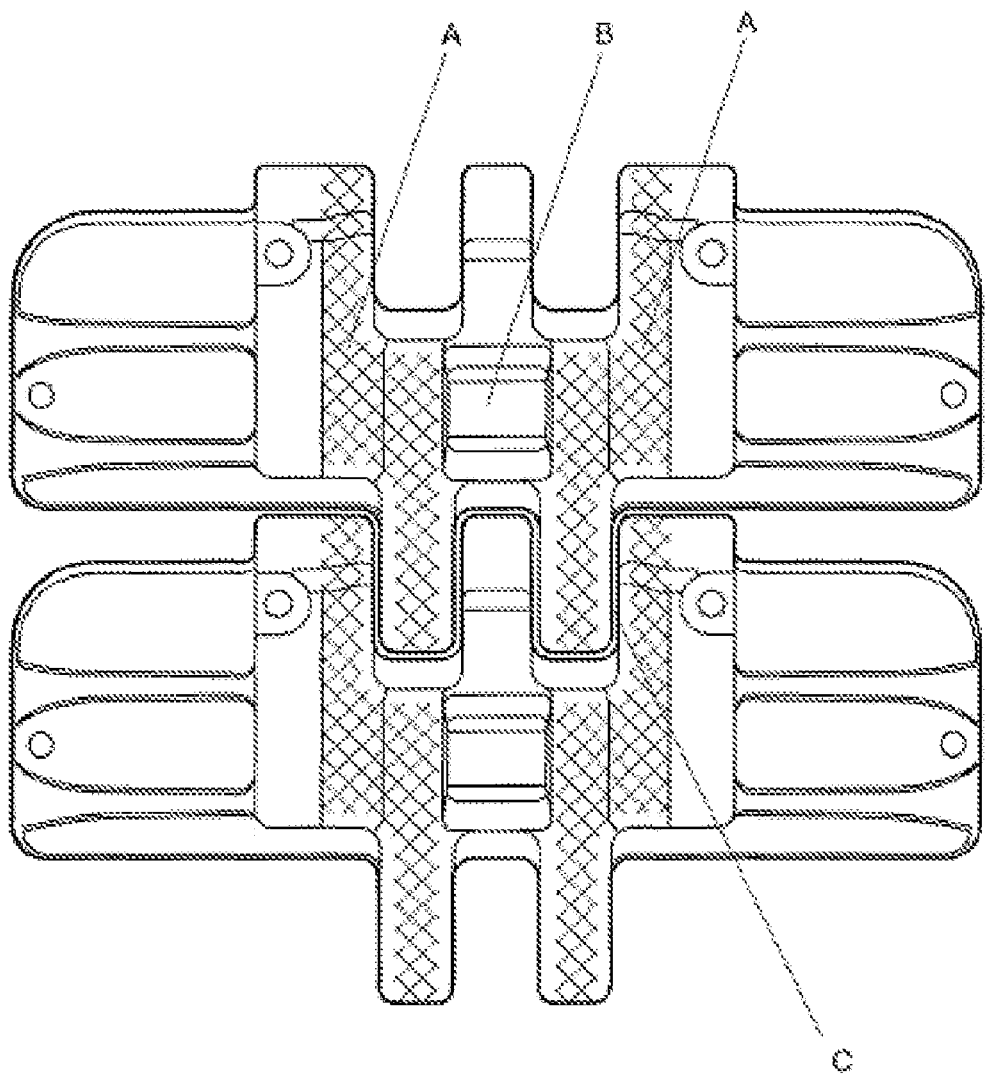
FIG. 1 is a plan view of a pair of known track shoes.

Advantageously, the crawler shoe 10 also has a pair of drive lugs 18, 19 located outside the respective drive paths 16, 17, as can be seen in FIG. 2. In use, the drive lugs 18, 19 are engaged by the respective teeth on opposite sides of a double sprocket (not shown). The drive lugs are recessed to form sunken V-shaped recesses between them, allowing the drive sprocket teeth to contact above the roller path at areas 18a and 19a and below the roller path at areas 18b and 19b, as shown in FIG. 2. Alternatively, the drive lugs may protrude from the shoe as shown in FIG. 1, so that the drive sprocket teeth contact above the roller path only, for example, at areas 18a and 19a.

By utilizing dual drive lugs in combination with dual roller paths, the wear life of the crawler shoe is maximized.

The above described crawler shoe combines an improved dual drive lug propel system with a "continuous roller path" or offset dual roller path design to minimize wear on both the drive lugs and the roller paths, and the drive sprocket teeth.

The foregoing describes only one embodiment of the invention, and modifications which are obvious to those skilled in the art may be made thereto without departing from the scope of the invention as defined in the following claims. For example, more than one trailing and leading lug may be provided on each shoe.

The invention claimed is:

1. A crawler track shoe comprising a body having
   a pair of parallel roller paths on an upper surface of the body upon which respective rollers travel in use,
   a pair of drive lugs operatively engaged by sprocket teeth, each drive lug being located adjacent a respective roller path and on a side of the respective roller path opposite to the other roller path,
   a leading connection lug located on one end of the body for articulated connection to a shoe adjacent said one end of the body,
   a trailing connection lug located on the opposite end of the body for articulated connection to another shoe adjacent said opposite end of the body,
   each roller path being aligned with, and extending along the top of, a respective connection lug and being of similar width thereto,
   wherein at each end of the body, the end of one roller path is longitudinally offset relative to the end of the other roller path in the direction of the roller paths, such that the transition from one shoe to an adjacent shoe along one roller path is longitudinally offset in the direction of the roller paths relative to the transition between the same shoes along the other roller path.

2. A shoe as claimed in claim 1, wherein each of the drive lugs has a sprocket tooth contact portion which is recessed below the roller paths.

3. A shoe as claimed in claim 2, wherein each of the drive lugs also has a sprocket tooth contact portion extending above the roller paths.

4. A crawler track shoe as claimed in claim 1 wherein each drive lug has a sprocket tooth contact portion extending above and below the roller paths.

5. A crawler track comprising a plurality of shoes linked together to form an endless track, each shoe comprising a body having
   a pair of parallel roller paths on an upper surface of the body upon which respective rollers travel in use,
   a pair of drive lugs operatively engaged by sprocket teeth, each drive lug being located adjacent a respective roller path and on a side of the respective roller path opposite to the other roller path,
   a leading connection lug located on one end of the body for articulated connection to a shoe adjacent said one end of the body,
   a trailing connection lug located on the opposite end of the body for articulated connection to another shoe adjacent said opposite end of the body,
   each roller path being aligned with, and extending along the top of, a respective connection lug and being of similar width thereto,
   wherein at each end of the body, the end of one roller path is longitudinally offset relative to the end of the other roller path in the direction of the roller paths, such that the transition from one shoe to an adjacent shoe in the track along one roller path is longitudinally offset in the direction of the roller paths relative to the transition between the same shoes along the other roller path.

6. A crawler track shoe as claimed in claim 5 wherein each drive lug has a sprocket tooth contact portion extending above and below the roller paths.

* * * * *